Figure 1:
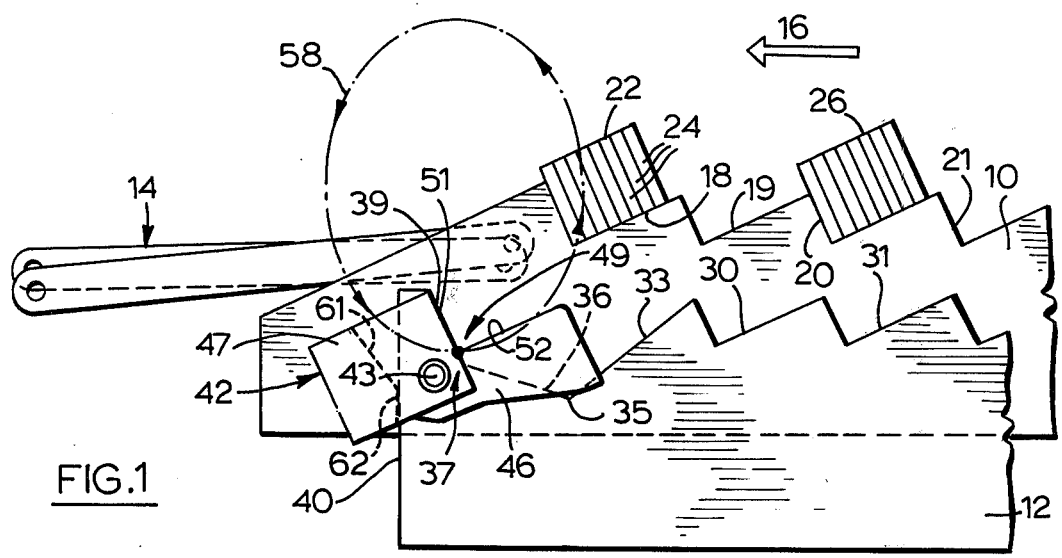

United States Patent [19]

Pretsch et al.

[11] 4,150,742
[45] Apr. 24, 1979

[54] IMBRICATING A GROUP OF FLAT BARS

[75] Inventors: Edwin R. Pretsch; Jan Cipris, both of Hamilton, Canada

[73] Assignee: The Steel Company of Canada, Limited, Hamilton, Canada

[21] Appl. No.: 868,524

[22] Filed: Jan. 11, 1978

[51] Int. Cl.$^2$ ............................................. B65G 47/26
[52] U.S. Cl. .................................... 198/459; 198/461
[58] Field of Search ............... 198/459, 460, 461, 462, 198/773, 774, 775, 776, 530, 423; 214/8.5 R; 271/3.1, 210

[56] References Cited

U.S. PATENT DOCUMENTS

| 1,950,377 | 3/1934 | Allen | 198/461 X |
| 4,022,332 | 5/1977 | Freakes et al. | 198/413 X |

FOREIGN PATENT DOCUMENTS 147962 9/1961 U.S.S.R. ................... 198/459

Primary Examiner—Robert B. Reeves
Assistant Examiner—Douglas D. Watts
Attorney, Agent, or Firm—Sim & McBurney

[57] ABSTRACT

An apparatus is provided for transferring packs of elongated flat bars in a direction normal to their length. The apparatus includes a first and second set of stationary arms, which are interleaved, and which all extend in the same direction. Both sets of arms are notched at their upper edges and means are provided to move one set of arms in a closed loop. Movable arms each have a modified notch at the downstream end with respect to flat bar travel, and this modified notch includes a dog member on at least some of the movable arms, the dog member defining a notch and pivoted to its respective arm adjacent the apex of the notch. The dog member is counterbalanced to retain the dog member with its notch oriented the same as the other notches of the arm so long as no flat bars are supported in the notch, but to allow the dog member to pivot when a pack of flat bars is supported in the dog member notch, the pivoting causing the bars to lean in the direction opposite the direction in which the flat bars are moving. The loop movement of the movable arms picks up, in the dog member notches, a pack of flat bars leaning in the forward direction, and pivots the bars so that all of them lean in the opposite direction, following which the bars are set down on a shuffle bar means adapted to separate the bars and transfer them further in the same original direction.

6 Claims, 5 Drawing Figures

IMBRICATING A GROUP OF FLAT BARS

This invention relates to the production of steel items known as "flats". The invention has particularly to do with the annealing process for the flats, which will be more clearly understood from the following description of the context of this invention.

In a mill for producing flats, an ingot or a bar produced from an ingot is successively rolled and narrowed to increase its length and to decrease its transverse dimensions until it becomes an item having a length in the region of 300 to 400 ft., a thickness in the area of ¼"-½", and a width in the area of 2" to 4". This is known as a flat bar.

The flat bars are rolled red hot, and they are ejected from the final roller assembly at high speed alongside an elongated annealing area. The annealing area is ordinarily a rectangular space with a length the same as the length of the flat bars, and a horizontal width in the region of 25 to 50 feet. The annealing area is of course located downstream adjacent the final set of rollers, from which the red hot flat bar is ejected.

In the production of flat bars, the flats ejected from the final roller assembly are in red hot condition and these race down along one of the long sides of the above-described annealing area. When each flat or flat bar gets to the end of its motion along the edge of the annealing area, it falls in against other previously ejected flats, against which it lies in surface contact. In the sample dimensions given previously it is the surface identified as the width of 2" to 4" that lies in surface contact with the corresponding surface of the previous flat bar.

The flat bars thus form what are called "packs" and conventionally each pack may contain from 5 to 12 flat bars.

Each successive pack formed by a plurality of red hot flat bars is then gradually and incrementally indexed laterally across the annealing area.

In order to facilitate this incremental transfer of packs of flat bars transversely across the annealing area (the purpose of which is to allow the red hot flat bars to cool at a predetermined cooling rate in order to obtain a particular grain size and structural composition in the steel), there are provided two sets of arms which extend horizontally at right angles to the long dimension of the flat bars. The first set of arms is a stationary set, and the individual arms span the entire width of the annealing area and are spaced apart from each other in parallel relation throughout the longer dimension of the annealing area. These arms are, in effect, girders which are about 1 ft. deep and roughly 1" in thickness, and which have their upper edges indented to form upwardly opening pockets or notches capable of receiving and supporting the individual packs of flats.

The other set of arms is a movable set, the arms of the movable set being interleaved with the arms of the stationary set, and being adapted to undergo substantially elliptical motion having about half of the movement in a condition raised above the stationary arms, and the other half in a condition lowered below the stationary arms. Thus, the movable arms come into alignment with the stationary arms to two locations in each elliptical loop, once on the way up and once on the way down. The direction of the looping elliptical movement is such that the movable arms are capable of picking up out of a given set of aligned notches in the stationary arms a pack of flat bars which had previously been deposited in that notch. The looping movement of the movable arms carries the pack up, forward in the advance direction across the annealing area, and then downwardly into another set of aligned notches in the stationary arms which is displaced in the forward or downstream direction from the original notch. This takes up about one half of the looping cycle for the movable arms, the other half of the cycle simply allowing the movable arms to return to their original position. However, when again the movable arms pass upwardly in alignment with the stationary arms, the old pack of flat bars will now be in a different notch of the stationary arms, and will be picked up by a different notch of the movable arms—one which is displaced further in the downstream direction from the notches used in the previous cycle. Thus, the particular pack of flat bars under discussion is moved in stepwise fashion or incrementally from notch to notch of the set of stationary arms, until the pack reaches the downstream end of the stationary arms. This process can be timed to take any length of time, this being dependent upon the nature of the annealing step that is desired. In other words, the movable arms can be programmed to undergo looping movements at 1 minute intervals, 10 minute intervals, or whatever.

Further in the downstream direction from the two sets of arms in conventional construction is located a plurality of pairs of shuffle bars, as they are called, which are again in two sets which are separately movable. Each set generally undergoes a shuffling or eccentric movement such that each passes above the other set for part of its motion and below the other set for another part of its motion. The motion, however, is of a smaller order of magnitude as compared to the motion of the movable arms, and the intention is merely to allow the pack of flat bars, which ultimately is set down in its closed configuration on the shuffle bars by the final "carry" of the movable arms, to separate out in such a way that no individual bar lies on top of any other. The shuffle bars, by virtue of their motion, carry the flat bars over to a conveyor which runs parallel with the main dimension of the flat bars, and which is adapted to carry the flat bars through a shearing machine in stepwise fashion, so that the flat bars can be sheared into appropriate lengths of 16 ft. 32 ft. or whatever may be desired.

In the prior art construction, the "pack" of flat bars is ordinarily indexed along the notches of the arms while leaning in the forward direction, i.e. the direction of their motion. In other words, the width of the flat bars (as opposed to the thickness) would be lying against the side of the "V" notch which is leaning upwardly in the forward direction of movement. Thus, when the movable arms set each pack of flat bars down on the shuffle bars, the furthest forward bar is caught or jammed under the weight of the subsequent bars, and this causes frictional forces which oppose the spreading out of the pack which is intended to be accomplished by the shuffle bars.

Attempts to ameliorate this difficulty have involved reversing the "shuffle" motion of the shuffle bars several times in order to shuffle the bars forward and backward in an attempt to separate the bars. However, this has required greater time than might otherwise to necessary, and has tended to slow the overall production rate by constituting a bottleneck location.

Usually, the solution has been to limit the number of flat bars in each pack to around six, although this also has tended to slow down the overall production rate.

In view of the foregoing difficulty, it is an aspect of this invention to provide a modification in the convention structure which will allow the flats to be separated more readily by the shuffle bars by ensuring that the forward bar of a pack is not caught or trapped under the weight of the subsequent bars, thus removing the bottleneck constituted at the shuffle bar location, and also allowing a greater number of bars to be included in each pack. Thus, from several points of view, the production process can be speeded up.

More specifically, this invention provides, in an apparatus for transferring packs of elongated flat bars in a given direction normal to their length, the apparatus including: a first set of similar stationary arms transverse to the bar length with notched upper edges for receiving the packs leaning in the given direction, a second set of similar movable arms interposed between adjacent stationary arms with notched upper edges matching the upper edges of the stationary arms, means for moving the movable arms in a closed loop, and shuffle bar means beyond the arms in said given direction, the improvement which comprises:

a modified notch at the downstream end of all of said movable arms, including a dog member on at least some of said movable arms defining a notch and pivoted to its respective arm adjacent the apex of the notch, the dog member being counterbalanced to retain the dog member with its notch oriented the same as the other notches of the arm so long as no flat bars are supported in the notch, but to allow the dog member to pivot when a pack of flat bars is supported in the dog member notch, the pivoting causing the bars to lean in the direction opposite said given direction, movement of said movable arms in said closed loop being adapted to pick up, in the dog member notches, a pack of flat bars leaning in said given direction, to pivot the bars to lean in the other direction, and to set the bars down on the shuffle bar means.

Furthermore, this invention provides a method of transferring packs of elongated flat bars in a given direction normal to their length, comprising:

transferring each pack of flat bars, the latter leaning in said given direction, in stepwise fashion along a series of upwardly opening notches in the upper edges of a set of stationary arms arranged transversely to the longitudinal extent of the bars, by picking up each pack with similar notches in the upper edges of a set of movable arms interleaved with the stationary arms; and raising the movable arms up, over and down again to drop the pack of flat bars into stationary arm notches further along in said given direction, repeating the preceding step until the pack has moved to the downstream end of the stationary arms in said given direction, picking up the pack in upwardly opening notches defined by dog members pivoted to the downstream ends of the movable arms at locations adjacent the apices of their notches, the dog members being counterbalanced so as to keep their notches upright when no pack is received therein, but so as to tilt their notches toward the upstream direction when weighted by receiving a pack, allowing the dog members to tilt toward the upstream direction to cause the flat bars to lean oppositely to said given direction, while lifting the pack up, over and down at a location further in said given direction, and depositing the pack, still leaning oppositely to said given direction, onto shuffle bar means downstream of said arms.

One embodiment of this invention is illustrated in the accompanying drawings, in which like numerals denote like parts throughout the several views, and in which:

FIGS. 1–5 show sequential, elevational views of a movable arm and a stationary arm over the course of one loop of elliptical motion of the movable arms.

Attention is first directed to FIG. 1 which shows the downstream end of one of a plurality of stationary arms 10 which are understood to be separated in the direction normal to the drawing paper and in parallel relation with each other. The numeral 12 designates the downstream end of one of a plurality of movable arms, again each movable arm being identical with and aligned with all the others. The numeral 14 designates one pair of shuffle bars, it being understood that a plurality of such pairs would be provided, all lined up with each other in the direction in which FIG. 1 is viewed. The arrow 16 designates the direction in which it is intended that packs of flat bars be incrementally shifted. Thus, the arrow 16 represents the downstream direction. The upper edge of the stationary arm 10 is shaped to define a plurality of notches, identified by the numerals 18, 19, 20 and 21, this being in sequence away from the extreme downstream end of the stationary arm 10. Located in the notch 18 is a pack 22 of eight flat bars 24. The notch 19 is empty, and another pack 26 of flat bars is located in the notch 20. The notch 21 is again empty. It is to be understood that, in the direction moving rightward from the portion of the stationary arm 10 seen in FIG. 1, every other notch is occupied by a pack of flat bars similar to those shown at 22 and 26 in the Figure.

The upper edge of the movable arm 12 shows the modification to which this specification is directed. A conventional movable arm would have a notch profile substantially identical to the notch profile for the stationary arm 10, with the notch 30 on the movable arm corresponding to the notch 20 on the stationary arm. Thus, notch 31 on the movable arm corresponds to the notch 21 on the stationary arm, but the notches to the left of the notch 30 on the movable arm 12 have been modified as now will be explained. To the left of the notch 30 on the movable arm 12, a larger, three-edged notch is provided. Immediately forwardly adjacent the notch 30 is an edge 33 which proceeds in the forward direction at a steeper angle to the horizontal, and which ends at an apex 35 from which proceeds an edge 36 extending in the forward and slightly upward direction to a further apex 37, from which again extends a third edge 39 which is steeper with respect to the horizontal than either of the other two edges. The movable arm then terminates in a vertical edge 40.

A dog member 42 is pivoted to the movable arm 12 at a pivot 43. The dog member includes a rearward plate portion 46 and a forward counterweight portion 47 which are securely affixed together as by welding and which between them define a notch 49 which is oriented and positioned so as to correspond in the stationary arm with the notch 18, so long as the dog member 42 is in the orientation shown in FIG. 1. Thus, the notch 49 has a side 51 which is aligned with the edge 39 of the modified notch at the forward end of the movable arm 12 and which slopes upwardly in the forward direction 16 when the dog member 42 is in the orientation shown in FIG. 1, and also has a side 52 which normally slopes upwardly in the reverse direction (i.e. in the direction which is reversed to the arrow 16) when the dog member is in the position of FIG. 1.

It will be noted that the pivot location 43 is located adjacent the apex of the notch 49, and more specifically is located at a point displaced below and forwardly of the apex of the notch 49, taking "fowardly" to refer to the forward direction identified by the arrow 16.

It will be noted in FIG. 1 that an ellipse has been shown in broken lines, identified by the numeral 58. This ellipse shows the general looping movement of the movable arm 12, and the arrow-heads on the ellipse indicate that the movement is in the counter-clockwise direction as pictured in FIG. 1. The specific ellipse 58 designates the locus of movement for the apex of the notch 49, which is designated by a spot at the lowermost location of the ellipse 58. It will be noted that the ellipse 58 passes through the apex of notch 18 on the stationary arm, which means that at one point in the elliptical looping movement of the movable arm 12, the apex of the notch 49 will come into conjunction with the apex of the notch 18 in the stationary arm 10.

Figure 2:
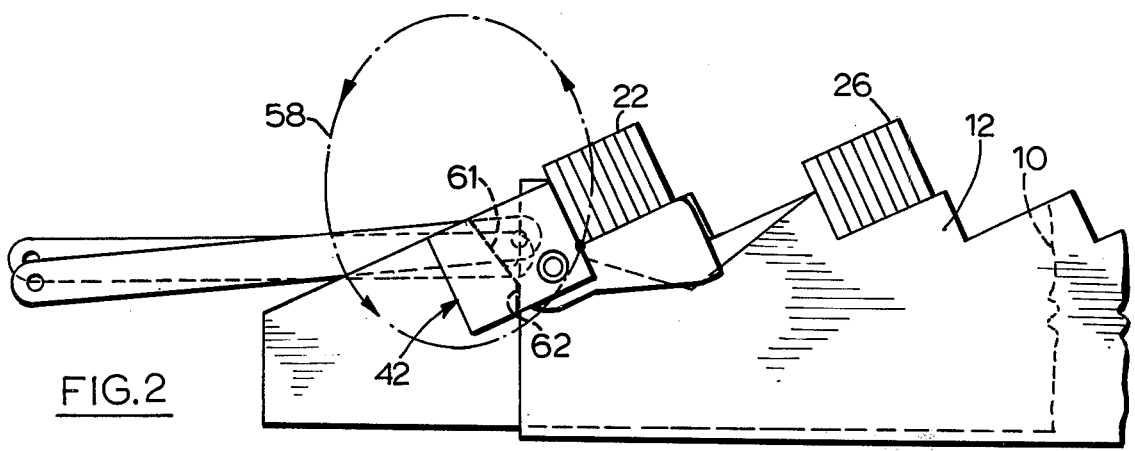

FIG. 2 shows this conjunction, and represents the point at which the weight of the pack 22 of flat bars originally in the notch 18 of the stationary arm 10 is transferred to the dog member 42 and thus to the movable arm 12.

Figure 3:
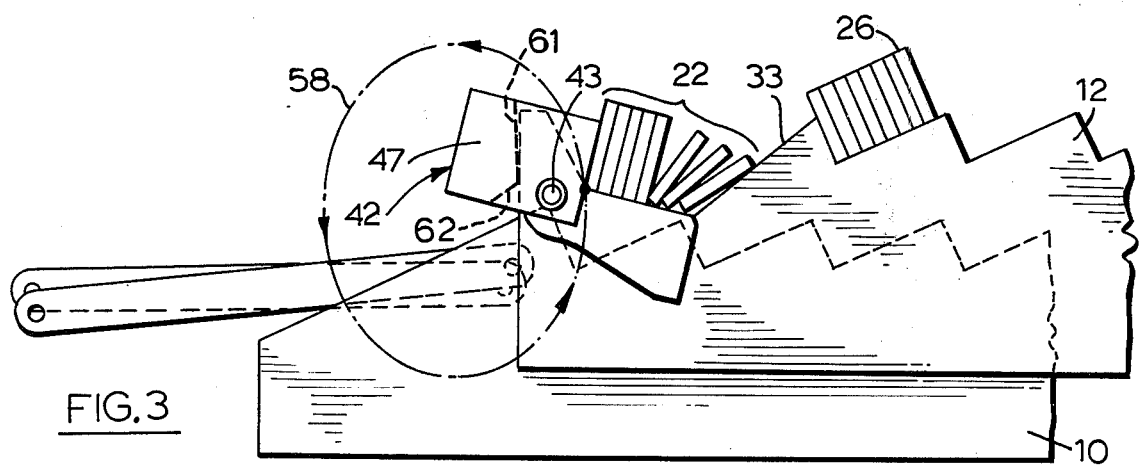

FIG. 3 shows what happens immediately after the weight of the pack 22 of flat bars has been transferred to the dog member 42. The counterweight 47 of the dog member 42 is not sufficient to maintain the original orientation of the dog member 42 against the clockwise torque applied to the dog member by the weight of the pack 22 applied to the right of the pivot location 43. As a result, the dog member pivots in the clockwise direction as seen in FIG. 3, which is a direction opposite to the direction of movement represented by the ellipse 58. It will be seen that the edge 33 of the modified notch at the downstream end of the movable arm 12 also supports part of the weight of the rearward bars in the pack 22, and prevents the bars from falling completely over in the rightward direction as pictured in the figures.

It should also be noted that, simultaneously with the engagement of the pack 22 of flat bars with the dog member 42, the notch 30 of the movable arm 12 engages and raises the pack 26 originally in the notch 20 of the stationary arm 10. In a similar way, all of the packs of flat bars located in the notches of the stationary arm 10 are raised in corresponding notches of the movable arm 12 beginning with the "conjunction" of the notch profiles represented by the FIG. 2 condition.

Figure 4:
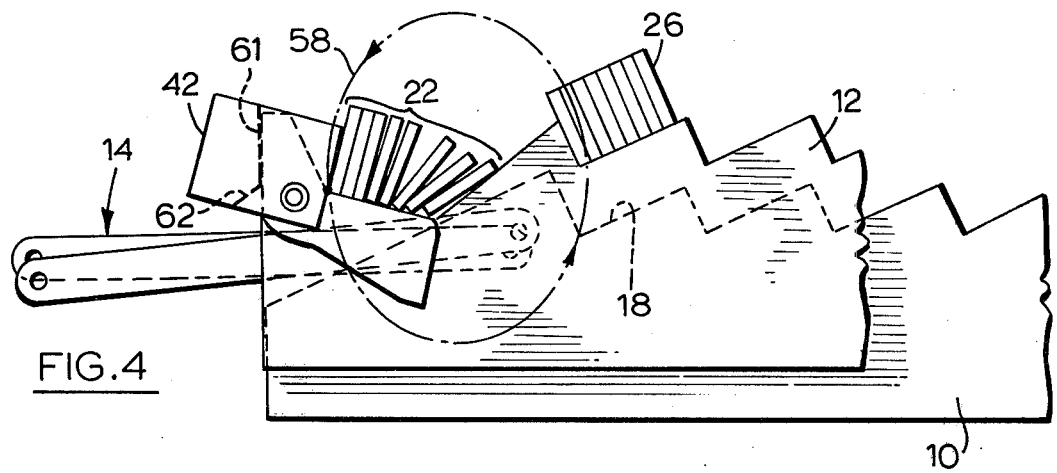

Following the position shown in FIG. 3, the point representing the apex of the notch 49 defined by the dog member 42 continues up and around the upper portion of the arc represented by the ellipse 58, thus carrying all of the packs of flats which had been raised up by the movable arm 12 in an arc upwardly, forwardly and then downwardly. FIG. 4 represents a point in time just prior to the setting down of each pack of flat bars into its respective new notch on the stationary arm 10. As can be seen, the pack 26 has been brought forward and is about to be deposited in the notch 18 of the stationary arm 10, while the pack 22, of which the "lie" has been reversed (i.e. the individual bars now lean in the reverse direction rather than leaning in the forward direction), is about to be deposited upon the pair 14 of shuffle bars.

Figure 5:
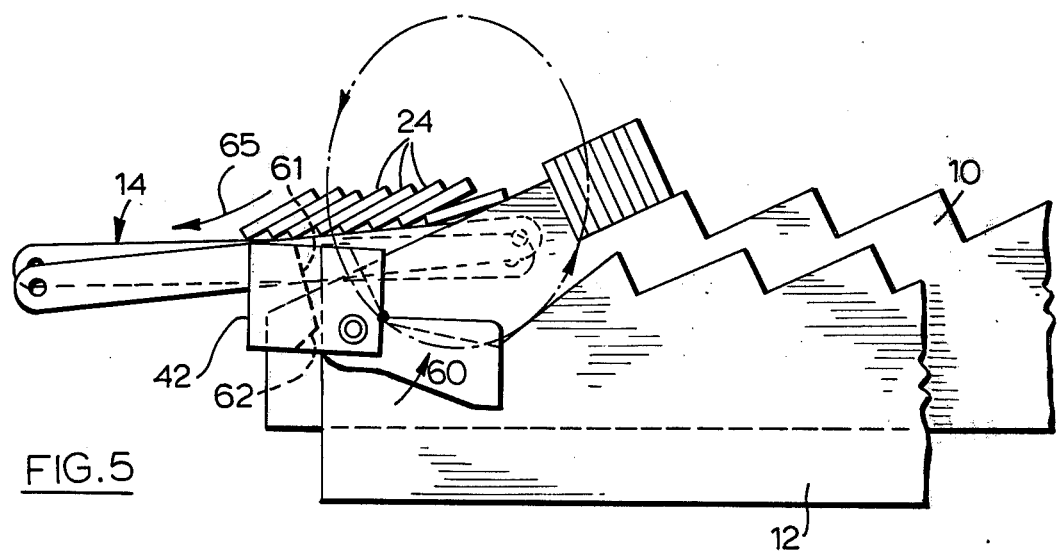

In FIG. 5, the movable arm has passed below its level of alignment with the stationary arm 10, and this has brought the dog member 42 below the level of the pair 14 of shuffle bars. In FIG. 5, the dog member 42 has begun to pivot in the counter-clockwise direction back toward its natural, "unweighted" position which is that shown in FIG. 1. The arrow 60 designates this return movement by the dog member 42. The dog member 42 is configured to define abutment faces 61 and 62 (in broken lines) which are adapted to abut against the edge 40 as shown in FIGS. 1 and 3, thus establishing limit positions for the pivoting movement of the member 42. Hence the return movement shown by arrow 60 is arrested in a position in which the notch is in the condition shown in FIG. 1.

As shown by the arrow 65 in FIG. 5, there is now a tendency for the flat bars 24 to slide off each other in the forward direction, without the leading ones of the flat bars being trapped or caught by the subsequent ones due to leaning in the forward direction.

It has been found that this reversal of the "lie" of the flat bars during the last "carry" by the movable arms not only allows a quicker separation of the flat bars after deposition on the pair 14 of shuffle bars, but also permits a greater number of flat bars in each pack. At present, up to twelve bars per pack are being handled successfully in this manner.

While the particular loop movement of the movable arm 12 is shown to be an ellipse, it will be understood that the elliptical shape is not essential. Any closed loop movement of circular or analogous shape would accomplish the necessary result, so long as the horizontal dimension of the closed loop is equal to the distance between one notch and another notch (not necessarily the next notch in sequence).

It will be noted that the angle of all notches is shown as substantially 90°, although an exact right angle is not considered essential.

We claim:

1. In an appartus for transferring packs of elongated flat bars in a given direction normal to their length, the apparatus including: a first set of similar stationary arms transverse to the bar length with notched upper edges for receiving the packs leaning in the given direction, a second set of similar movable arms interposed between adjacent stationary arms with notched upper edges matching the upper edges of the stationary arms, means for moving the movable arms in a closed loop, and shuffle bar means beyond the arms in said given direction, the improvement which comprises:

a modified notch at the downstream end of all of said movable arms, including a dog member on at least some of said movable arms defining a notch and pivoted to its respective arm adjacent the apex of the notch, the dog member being counterbalanced to retain the dog member with its notch oriented the same as the other notches of the arm so long as no flat bars are supported in the notch, but to allow the dog member to pivot when a pack of flat bars is supported in the dog member notch, the pivoting causing the bars to lean in the direction opposite said given direction, movement of said movable arms in said closed loop being adapted to pick up, in the dog member notches, a pack of flat bars leaning in said given direction, to pivot the bars to lean in the other direction, and to set the bars down on the shuffle bar means.

2. The invention claimed in claim 1, in which the closed loop is substantially an ellipse, and in which all upper edge notches are V-shaped with one side of the V sloping in said given direction and the other side sloping in the opposite direction, the dog member notch having two sides sloping in opposite directions when no flat bars are supported therein, but swinging under load to a position in which the side formerly sloping in the given direction now slopes in the reverse direction, and the other side changes from sloping upwardly in the reverse direction to sloping downwardly in the reverse direction.

3. The invention claimed in claim 2, in which the angle of all notches is substantially 90°.

4. The invention claimed in claim 2, in which the dog member is pivoted at a point displaced below and forwardly of the notch apex in said given direction.

5. An apparatus for transferring packs of elongated flat bars in a given direction normal to their length and then separating the bars in each pack, comprising:
- a first set of parallel spaced-apart stationary arms arranged transverse to the bar length, all arms having aligned, notched upper edges capable of receiving and supporting packs of flat bars in the notches,
- a second set of parallel movable arms interleaved with the stationary arms, said movable arms having aligned, notched upper edges corresponding to the upper edges of the stationary arms,
- means for causing the movable arms to move repeatedly and continuously through a closed loop in the vertical plane such that the movable arms rise upwardly past the stationary arms, arc over in the said given direction while remaining above the stationary arms, return downwardly past the stationary arms at a position displaced from the upwardly rising location in the said given direction, and then arc back beneath the stationary arms to return to the upwardly rising location, the notches of the stationary and the movable arms being aligned in the direction of flat bar elongation when the two sets of arms are generally even with each other at the upwardly rising location and the downwardly returning location,
- shuffle bar means beyond the arms in the said given direction for advancing flat bars in said given direction,
- at least some of said second set of arms having a modified notch at the downstream end in said given direction, the modification including the provision of a counterbalanced dog member defining an end notch thereof and being pivoted to its respective arm adjacent the apex of said defined end notch, the counterbalance being such as to retain the dog member with its notch oriented the same as the other notches in the arm so long as no flat bars are supported in the notch of the dog member, but to allow the dog member to pivot in the sense opposite that of the closed loop of arm motion when a pack of flat bars is supported in the dog member notch,
- the closed loop being such as to cause the movable arms to set down, on said shuffle bar means, any flat bars picked up in the notch defined by the dog member, whereby flat bars which when so picked up are leaning in the said given direction will rotate along with the dog member as it pivots under their weight, and will be set down on the shuffle bar means leaning in the direction opposite said given direction.

6. A method of transferring packs of elongated flat bars in a given direction normal to their length, comprising:
- transferring each pack of flat bars, the latter leaning in said given direction, in stepwise fashion along a series of upwardly opening notches in the upper edges of a set of stationary arms arranged transversely to the longitudinal extent of the bars, by picking up each pack with similar notches in the upper edges of a set of movable arms interleaved with the stationary arms; and raising the movable arms up, over and down again to drop the pack of flat bars into stationary arm notches further along in said given direction,
- repeating the preceding step until the pack has moved to the downstream end of the stationary arms in said given direction,
- picking up the pack in upwardly opening notches defined by dog members pivoted to the downstream ends of the movable arms at locations adjacent the apices of their notches, the dog members being counterbalanced so as to keep their notches upright when no pack is received therein, but so as to tilt their notches toward the upstream direction when weighted by receiving a pack,
- allowing the dog members to tilt toward the upstream direction to cause the flat bars to lean oppositely to said given direction, while lifting the pack up, over and down at a location further in said given direction,
- and depositing the pack, still leaning oppositely to said given direction, onto shuffle bar means downstream of said arms.

* * * * *